Sept. 27, 1932.  D. H. SHAPIRO  1,880,110
MACHINE AND METHOD FOR MANUFACTURING ARTICLES
FROM VISCOUS SUBSTANCES
Filed Feb. 21, 1929   2 Sheets-Sheet 2
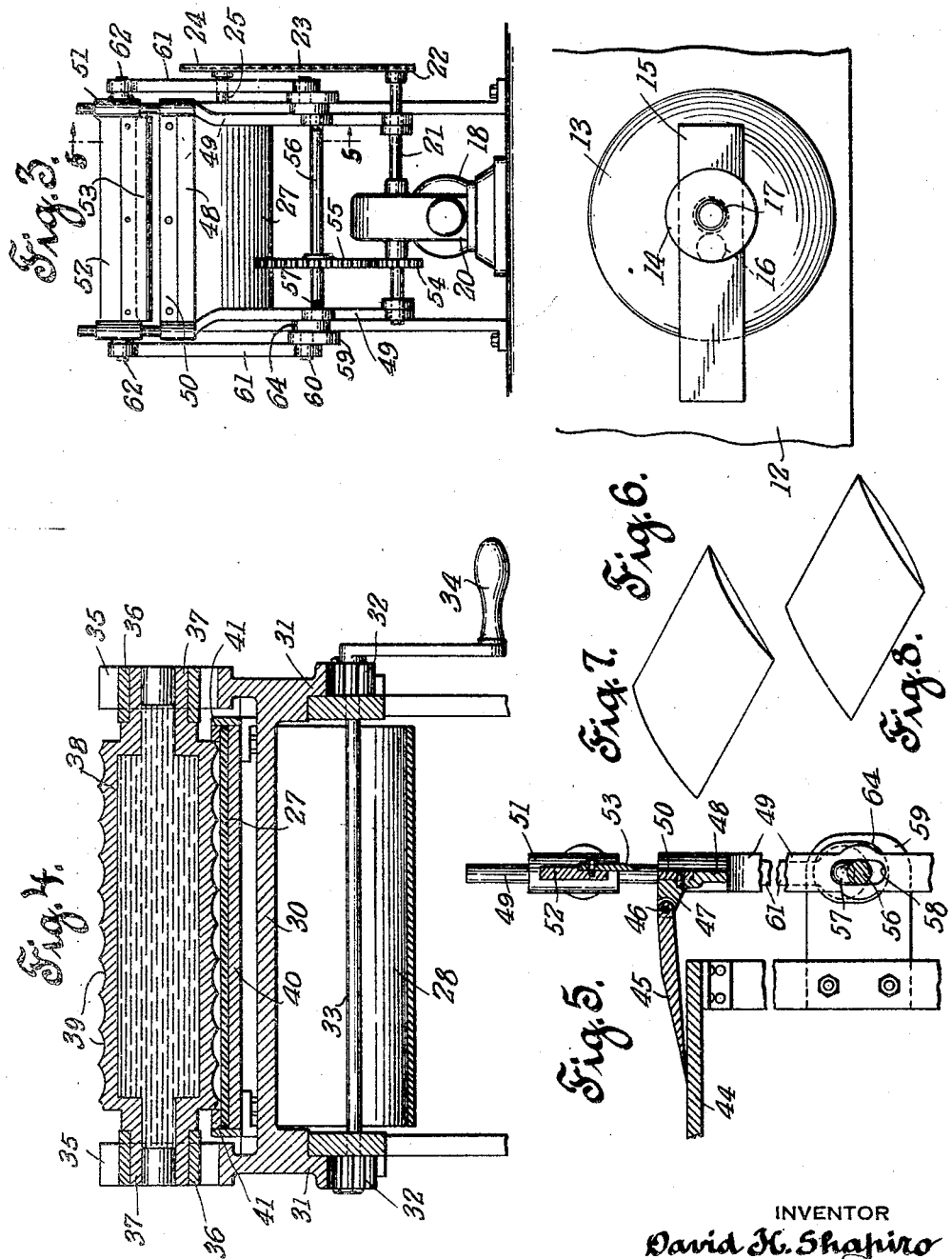
INVENTOR
David H. Shapiro
BY
Maxwell E. Sparrow
ATTORNEY Patented Sept. 27, 1932

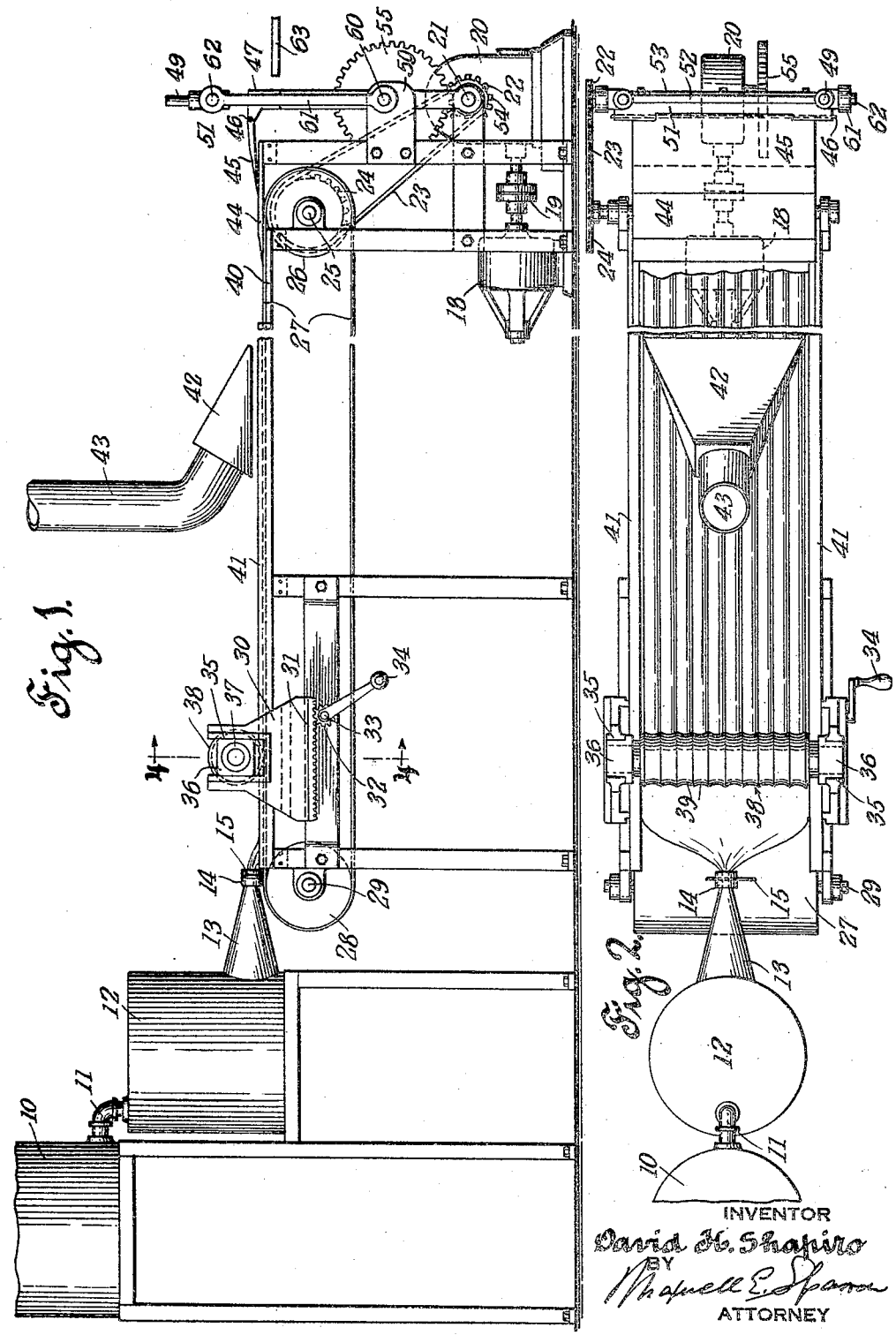

1,880,110

UNITED STATES PATENT OFFICE

DAVID H. SHAPIRO, OF NEW YORK, N. Y.

MACHINE AND METHOD FOR MANUFACTURING ARTICLES FROM VISCOUS SUBSTANCES

Application filed February 21, 1929. Serial No. 341,811.

This invention relates to improvements in machines and method for manufacturing rigid articles from substances rendered plastic by heat, and has special reference to thin articles having blade-like edges used in marking woven textiles and known commercially as tailor's chalk.

Such devices are usually elongated rectangles in side elevation, quite thin and shaped to present opposed converging lateral edges, the substance being of a nature to impart a clearly defined line when drawn in frictional contact over the surface of fabrics, delineating a pattern or such other marking as may be desired.

The better types of such marking devices are composed principally of wax, both vegetable and mineral being used, in which is incorporated powdered talc or soapstone, stearic acid and pigment when the waxes are in a melted condition.

Heretofore, it has been customary in making articles of waxy composition to mould the individual pieces of articles in individual moulds, the particular shape desired being imparted to it by the mould.

The present invention has as its main object the provision of a machine which will produce such articles in a continuous running operation without the use of individual moulds.

It is a further object of the invention to produce such articles by rolling and simultaneously slitting a semi-fluid or viscous sheet into a plurality of strips and finally cutting the strips into uniform lengths in a continuous operation, ready for sale and use.

By this invention other articles, such as chocolate bars or other candy may be made from a semi-fluid or viscous material.

It is a further object of this invention to produce such articles either with a level and a curved surface or with opposed convex surfaces, meeting to produce blade-like edges.

A further feature is in the provision of a machine for forming such articles in a rapid and effective manner, without loss or waste of material.

A further object is in the provision of a method for producing such articles in a rapid and effective manner.

These and other objects are accomplished by the novel and simple machine and method hereinafter described and shown in the accompanying drawings, forming a material part of this disclosure, and in which:—

Figure 1 is a side elevational view of a machine embodying the features of the invention.

Figure 2 is a top plan view of the same.

Figure 3 is a front end elevational view thereof.

Figure 4 is a partial transverse sectional view taken on line 4—4 of Figure 1 and drawn to an enlarged scale.

Figure 5 is a transverse sectional view taken on line 5—5 of Figure 3.

Figure 6 is an enlarged front elevational view of the delivery pot spout and control means therefor.

Figure 7 is a perspective view of a complete article having a flat or level side.

Figure 8 is a similar view of a like article in which both sides are curved.

In the general views, shown in Figures 1 and 2, a mixing tank, designated by the numeral 10, is indicated as being raised considerably above the flooring surface level, to receive the several substances which enter into the composition of the "chalk," the tank being supplied with any preferred heating means, not shown, to melt the wax into a softly plastic or semi-fluid condition.

Pipe connections 11 lead from the bottom of the tank to a delivery pot 12, also provided with heating means, and having near its bottom a conical spout 13 extending outwardly from the front for a considerable distance.

At the end of the spout is a discharge head 14 slotted transversely to receive a slidable plate 15 having an aperture 16 which upon moving the plate, may be made to register with the opening 17 through the head, thus effectually controlling the discharge of the molten wax, this arrangement constituting a simple but effective form of gate valve, see Figure 6.

A motor 18, at the front of the machine, is connected by a coupling 19 to a speed reducing device, designated generally by the numeral 20, and through which passes a shaft 21 having fixed on one of its ends a sprocket 22.

This sprocket drives a chain 23 trained over a sprocket 24 mounted on a shaft 25 journalled in brackets carried by frame members of the machine, the shaft having on it a drum 26 over which is trained a wide conveyor belt 27 of any suitable material, this belt extending horizontally lengthwise of the machine to run over a similar drum 28 mounted on a shaft 29, disposed below the end of the spout 13, see Figure 1.

Slidably mounted on the rear portion of the machine frame is a carriage 30, its downwardly flanged ends 31 being provided with rack teeth to engage pinions 32 fixed on the opposite ends of a shaft 33 journalled in the frame and having a manually operable crank handle 34 fixed at one end whereby the carriage may be shifted towards or away from the spout 13.

Above the flanges 31 the carriage is provided with forks 35 in which is received bearings 36 for the ends of hollow trunnions 37, having between them a hollow cylindrical roll 38, the peripheral surface of which is annually grooved, as at 39, to produce the desired shape of the plastic strips of the material as they pass below on the conveyor belt 27.

This belt is preferably supported throughout the length of its upper run, as at 40, and provided at its side edges with fixed guides 41 whereby the stream of plastic material, issuing from the spout 13, is prevented from escape off the belt.

The cylinder 38 is filled with water to maintain it preferably in a cool condition and also to increase its weight so that the ridges between the grooves 39 demark and cut the plastic material into strips of uniform width, as well as give them a crowned upper surface while passing therebelow resulting in the strips acquiring a cooled film coating and polished appearance.

These strips are further hardened and solidified by delivering upon their upper surface a blast of cold air from a head 42, positioned either before or after the cutting mechanism hereinafter described, depending upon the transverse cross-sectional shape of "chalk" desired, the said head being connected with some form of blower by the pipe 43.

Extending rearwardly from the front portion of the machine frame is a plate 44 having a keen knife-like edge arranged to merely clear the top surface of the belt, raising the strips of material, as they advance and deliver them upon the upper surface of a similar scraper blade 45, pivoted transversely at 46 to lugs 47 at the ends of a bar 48 carried by levers 49 fulcrumed at their lower ends on the shaft 21. It can be readily seen that, on account of the tendency of the material to stick to the conveyor belt, in order to transversely cut the material it is necessary to separate or raise the strips of material from the conveyor belt, as the material advances, and to provide means to support the material during the cutting operation. The function of bevel plate or blade 44 is to raise or separate the strips from the conveyor belt. The function of blade 45 is to lift the material by means of its sharp edge from plate 44 thereon for the cutting operation. Although it is preferable to have both plates 44 and 45, the plate 44 may be extended, the extension being in lieu of plate 45.

A fixed shear blade 50 is secured to the front of the bar 48, its upper edge being level with the surface of the scraper blade 45.

Slidable on the upper cylindrical portions of the levers 49 are sleeves 51 having between them a rigid bar 52 on which is fixed a shear blade 53 to co-operate with the fixed shear blade 50.

Carried by the shaft 21 is a spur pinion 54 meshing with a gear 55 fixed on a shaft 56 journalled in the frame side above the parallel with the shaft 21 and formed on the shaft 56 are cranks 57 rotatable in slots 58 formed in levers 49, the arrangement being such as to cause the levers to oscillate upon the shaft 21, moving their upper ends backward and forward with respect to the on coming ends of the strips and in timed relation to their movement.

The ends of the shaft 56 are provided with plates 64 having eccentric pins 60 to engage with bars 61, the same being connected to studs 62 extending from the sleeves 51, thereby moving the bar 52 and shear blade 53 up and down reciprocatively and in timed relation to their forward and back movement, severing the advanced ends of the strips into pieces of uniform length at the end of their outward motion and permitting them to drop upon a receiver 63, as seen in Figure 1.

In moving from the shear blades, the complete articles may be produced with one flat surface, as in Figure 7, or by lowering the receiver 63, the articles, in dropping turn over and, due to the fact that they are still in a warm plastic state only the top surface having been chilled, the articles assume a shape as seen in Figure 8, in which both sides are substantially alike.

If it is desired to produce the articles with one flat surface it is preferable to have the blast of cold air from head 42 reach the material before the latter is being cut by the cutting mechanism, and if it is desired to produce the articles with curved convex surfaces as shown in Figure 8, it is preferable to have the blast of cold air reach the material after the latter is cut by the cutting mechanism.

From the foregoing it will be seen that a complete mechanism and method has been disclosed, for making articles from a semi-fluid or viscous composition, in the preferred form of its embodiment, but it will be understood that changes and variations may be resorted to within the scope of the appended claims.

Having thus described the invention what is believed new and sought to secure by Letters Patent, is:—

1. A machine for rolling plastic substances comprising a travelling conveyor belt to receive the substance in a semi-liquid condition, a cooled roll to shape and divide the substance into strips, means to cut the strips transversely into predetermined lengths, and means associated with the conveyor belt and cutting means for causing separation of the strips from the belt immediately prior to their being cut transversely and for supporting the strips while being cut.

2. A machine for rolling plastic substances comprising a travelling conveyor belt to receive the substance in a semi-liquid condition, a cooled roll to shape and divide the substance into strips, means to cut the strips transversely into predetermined lengths, means associated with the conveyor belt for causing separation of the strips from the belt prior to their being cut transversely and for supporting the strip while being thus cut and means to cool the lengths.

3. A machine for rolling plastic substances comprising a travelling conveyor belt to receive the substance in a semi-liquid condition, a water cooled roll to shape and divide the substance into strips, means to cool the strips as carried by said belt, means to cut the strips transversely into predetermined lengths, and means associated with the conveyor belt for causing separation of the strips from the belt prior to their being cut transversely and for supporting the strip while being thus cut.

4. A machine for manufacturing articles composed of melted waxes comprising means for controlling the supply of melted material, a conveyor belt to receive the material, means for driving said belt, guiding and supporting means for the belt, a fluid cooled roll having a grooved periphery to shape the material into strips on said belt, means for adjusting the positions of said roll lengthwise of the belt, and means for severing the strips transversely prior to emerging from the machine.

5. A machine for manufacturing articles composed of melted waxes comprising means for controlling the supply of melted material, a conveyor belt to receive the material, means for driving said belt, guiding and supporting means for the belt, a fluid cooled roll having a grooved periphery to shape the material into strips on said belt, means for adjusting the positions of said roll lengthwise of the belt, means associated with the conveyor belt for causing separation of the strips from the belt prior to their being cut transversely and for supporting the strip while being thus cut, and means for severing the strips transversely prior to emerging from the machine.

6. A machine for manufacturing articles composed of melted waxes comprising means for controlling the supply of melted material, a conveyor belt to receive the material, means for driving said belt, guiding and supporting means for the belt, a fluid cooled roll having a grooved periphery to shape the material into strips on said belt, means for adjusting the positions of said roll lengthwise of the belt, means for cooling the strips on the belt, means associated with the conveyor belt for causing separation of the strips from the belt prior to their being cut transversely and for supporting the strip while being thus cut, after cooling, and means for severing the strips transversely prior to emerging from the machine.

7. In a machine for manufacturing articles of waxy material, the combination with means for rendering the material plastic and a rigidly supported horizontal conveyor belt to receive the material, of means to control the quantity of material delivered to said belt, a carriage adjustable over the belt, an annularly grooved hollow roll mounted to rotate in said carriage transversely of the belt, said roll separating the plastic mass on said belt into strips formed by the roll grooves, and means for cooling said roll.

8. In a machine for manufacturing articles of waxy material, the combination with means for rendering the material plastic and a rigidly supported horizontal conveyor belt to receive the material, of means to drive said belt continuously, combined means for shaping and separating the material on the belt into uniform strips of given cross-section, means for cooling and hardening the strips on the belt, means for raising the strips from the belt, a blade over said raising means, means for moving said blade reciprocally, and means for shearing the strips combined with said blade moving means.

9. In a machine for manufacturing articles of waxy material, the combination with means for rendering the material plastic and a rigidly supported horizontal conveyor belt to receive the material, of means to drive said belt continuously, combined means for shaping and separating the material on the belt into uniform strips of given cross-section, means for cooling and hardening the strips on the belt, means for separating the strips from the belt at the end of its upper run, a blade to receive the strip from said separating means, means for moving said blade reciprocatingly, a fixed shear combined with said blade, a movable shear co-operative with said fixed shear, and means for actuating the movable shear reciprocatively in unison with said blade to cut the strips into predetermined lengths.

10. In a machine for manufacturing articles of waxy material, the combination with means for rendering the material plastic and a rigidly supported horizontal conveyor belt to receive the material, of means to drive said belt continuously, combined means for shaping and separating the material on the belt into uniform strips of given cross-section, means for cooling and hardening the strips on the belt, means for separating the strips from the belt at the end of its upper run, a blade to receive the strip from said separating means, means for moving said blade towards said separating means to receive the on-coming strip ends and to move outwardly with them a predetermined distance, and means for shearing said strips into uniform lengths during the outward movement of blade moving means.

11. In a machine for manufacturing articles of waxy material, the combination with means for rendering the material plastic and a rigidly supported horizontal conveyor belt to receive the material, of means to drive said belt continuously, combined means for shaping and separating the material on the belt into uniform strips of given cross-section, means for cooling and hardening the strips on the belt, a fixed knife blade transversely of the belt to separate the strips therefrom a second knife blade to receive the strips from said fixed blade, means to oscillate the second blade reciprocatively in timed relation to the movement of the strips, a fixed shear blade combined with said second knife, a slidable shear blade co-operative with the fixed blade and movable in unison therewith, and means for moving the slidable shear blade with respect to the fixed shear blade to sever the strips into uniform lengths.

12. The method of forming articles from a continuous sheet of viscous composition which consists in simultaneously rolling, chilling the surface of, and slitting said sheet into longitudinal strips, then shearing pieces of uniform lengths from the finished ends of the strips, and then causing the cut lengths to be inverted and dropped onto a plane surface whereby the flat surface becomes convex.

13. The method of forming tailor's marking chalk from a waxy composition which consists of melting the composition to a condition of fluidity, dispensing the mass upon the surface of a moving conveyor belt in the form of a flat sheet, subjecting the exposed surface of the sheet when on the conveyor belt to a cold roller having a peripherally grooved surface whereby to divide the sheet into strips and form the contour of the exposed surface of each strip, cutting the strips while grouped, into definite lengths, and causing the cut lengths to be inverted and dropped on a plane surface whereby the flat surface becomes convex.

14. That step in the method of shaping marking chalk which consists in inverting the piece after the contour of the upper surface has been formed and allowing it to fall by gravity onto a plane surface so that the impact will cause the opposed surface to assume a contour complementary to the first surface.

In testimony whereof I have affixed my signature.

DAVID H. SHAPIRO.